March 2, 1954  M. S. DUNKELBERGER  2,670,736
TUBULAR SUPPORTING MEMBER
Original Filed March 1, 1946

INVENTOR.
MILTON S. DUNKELBERGER
BY
HIS ATTORNEYS

Patented Mar. 2, 1954

2,670,736

UNITED STATES PATENT OFFICE 2,670,736

TUBULAR SUPPORTING MEMBER

Milton S. Dunkelberger, Dayton, Ohio

Original application March 1, 1946, Serial No. 651,395. Divided and this application June 19, 1951, Serial No. 232,401

3 Claims. (Cl. 128—132)

This invention relates to a device to facilitate manipulation of rubber members and the method for doing so and more particularly to a device that may be used in starting the insertion of a rubber tubular member having a closed end upon a member of the human body.

When a rubber finger-stall is to be applied to a finger or when a rubber tubular member is to be applied to the human body member for prophylactic or hygienic purposes, great difficulty is encountered in the application of the rubber member.

An object of this invention is to provide a support for a flexible tubular member having a closed end and adapted to be rolled upon the support, the support holding the rolled portion of the tubular member while the closed end is projected through the tubular member and while the closed end portion of the tubular member is applied to a member of the human body, the support holding the rolled portion until the member of the human body has been projected into the closed end, after which the rolled portion is rolled off the support and unrolled upon the member of the human body.

Other objects and advantages reside in the construction of parts, the combination thereof and the mode of operation, as will become more apparent from the following description.

Referring to the drawings, Figure 1 is a longitudinal cross sectional view showing a flexible tubular member having a closed end and a roll portion supported upon a supporting member.

Figure 1:
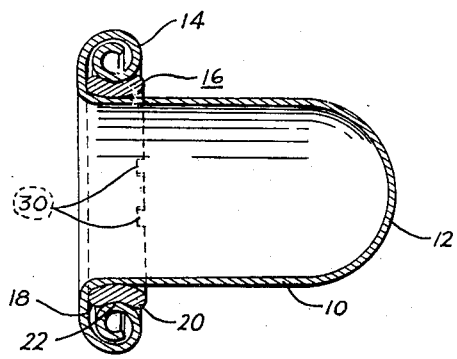
Figure 2:
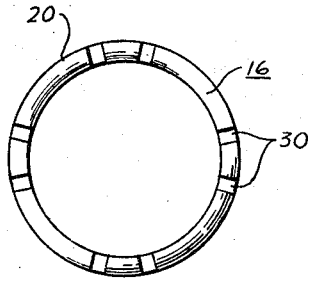
Figure 2 is a side elevational view of the support showing indentations used for the purpose of identification.

In the drawings, the reference character 10 indicates a rubber tubular member provided with a closed end 12. The open end of member 10 before use is generally rolled or coiled into a ring. These rubber members may be shipped, packed and stored in this condition. In the past, when using the rubber member, the member of the body to be covered has its end inserted against the closed end of the rubber member and then the member is unrolled, so as to be stretched over the member of the body to be protected. This is oftentimes a difficult manipulation, for the reason that when rolling the rubber, the rolled portion is not easily stretched.

To facilitate insertion of the member of the body, the rubber member may be partially unrolled and the coil or roll 14 of the rubber member rolled upon a ring or supporting member 16. This ring 16 may be made from metal, plastic molding material or any other suitable material, having the required rigidity. In Figure 1 the roll portion has been shown schematically at 14. In this particular figure only a small number of the convolutions have been shown. In actual use the roll portion may consist of a large number of convolutions. Furthermore, in this figure the thickness of the rubber member has been greatly exaggerated, for convenience in drawing. As is well known to those skilled in the art, these rubber members, especially if used for prophylactic purposes, are extremely thin and of light weight.

Figure 3:
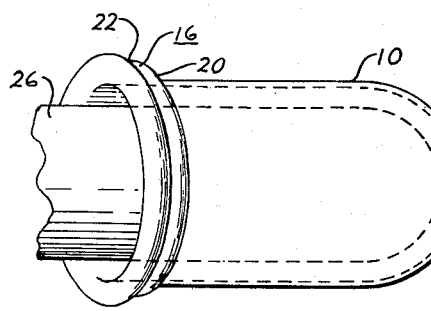
Figure 3 is a perspective side elevational view with the supporting ring in position.
Figure 4:
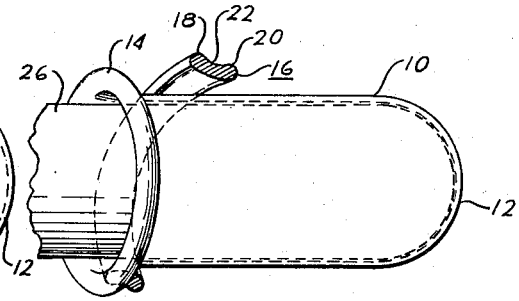
Figure 4 is a view similar to Figure 3, but showing the supporting ring partially removed and in section.

The ring or supporting member 16 has a pair of rib-like marginal portions 18 and 20, cooperating to form an annular groove 22 that is concave in cross sectional area, as clearly seen in Figures 1 and 4. This annular groove forms a seat for the rolled rubber. A portion of the member of the body to be protected has been shown schematically at 26. The end of member 26 is projected into the tubular member 10, having the roll 14 supported upon the ring 16, as shown in Figure 3.

As may be seen in Figure 4, the roll 14 is rolled or stripped off the ring 16, so that the ring 16 may be removed and the balance of the rubber member rolled upon the member of the body to be protected. As may be clearly seen in Figure 4, the tubular rubber member 10 has been unrolled over and beyond the tapered or curved end portion of the member to be protected, so as to permit easy unrolling of the portion of the rubber forming the roll 14. The ring or supporting member 16 forms a temporary support for the roll 14 of the rubber member 10.

As may be clearly seen in Figure 1, a portion of the rubber member extends through the annular supporting member or ring 16 and the coil or roll 14 is so positioned on the ring 16 that the coil or roll portion of the rubber member may be rolled from the supporting member or ring 16, the roll being rotated in the direction such that as the rolling operation continues, the roll is unwound upon the member to be protected. As viewed in Figure 1, the roll is rotated in a counterclockwise direction to remove the roll from the supporting member or ring 16. By continuing the rolling of the roll in a counterclockwise direction, the roll is unrolled and when the member of the human body is inserted therein, the tubular member is unrolled upon such a member. If the roll were mounted upon the supporting member in such a manner that in rolling the roll from the supporting member or ring the roll would not unwind, the supporting member would then be of no use.

In order to provide identification marks that may be felt, any suitable indentations or irregularities, such as notches 30, may be cut or formed in the rib 20, that is, the exposed rib of the supporting member. These irregularities or identification marks may be felt by touching the ring or supporting member 16. The member of the human body should enter the ring from the side opposite the identification marks, so as to position the rubber member 10 upon a member of the human body, without the member of the body being visible.

Due to the fact that the rubber member is made from flimsy, light weight material, and due to the fact that the rubber member may be used in association with delicate tissues, all surfaces of the ring 16 are preferably highly polished, so as to present a smooth surface that is not likely to injure the rubber member or the member of the body. A slight hole in the rubber member may defeat its usefulness.

The ring or support 16 has a maximum diameter that is less than the diameter of the rolled portion of the tubular member mounted on the ring or support 16.

Throughout the specification and claims the rubber member has been referred to as having a closed end. The device herein could be used for a rubber member having an open end, as for example, it could be used in connection with an elastic hose or leg protector, used by victims of varicose veins.

Furthermore, "ring," as used herein, need not necessarily be a round ring; but could be a polygonal member having a peripheral seat for the roll of the rubber member.

This application is a divisional application of my copending application Serial No. 651,395 filed March 1, 1946, for Tubular Supporting Member, now Patent No. 2,567,926, issued September 18, 1951.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. The combination of an annular ring with a rubber tubular member having a closed end adapted to be applied upon an external member of the human body, the margin of the annular member being provided with an annular seat, a roll formed from a portion of the rubber tubular member mounted upon the annular seat so as to permit the closed end of the rubber member to project through the center of the annular ring, the closed end of the rubber member forming a cup-shaped cavity so as to facilitate the application of the rubber member upon the external member of the human body, the maximum diameter of the ring being less than the diameter of the rolled portion of the rubber member supported thereon.

2. The combination of an annular ring with a rubber tubular member according to claim 1, wherein one margin of the ring is provided with irregularities discernible to touch, the side having the irregularities being exposed when the roll of the rubber tubular member is mounted in the seat of the ring.

3. The combination of an annular ring with a prophylactic rubber tubular member having a closed end adapted to be applied upon an external member of the human body, the margin of the annular member being provided with a pair of rib-like portions cooperating to form an annular seat, a roll formed from a portion of the rubber tubular member supported upon said seat so as to permit the closed end of the rubber member to project through the center of the annular ring, the closed end of the rubber member forming a cup-shaped cavity so as to facilitate the application of the rubber member upon the external member of the human body, the maximum diameter of the ring being less than the diameter of the rolled portion of the rubber member supported thereon, the internal diameter of the ring being larger than the diameter of the member of the body to be protected, the exposed margin of the ring when supporting the rubber member being provided with identification marks that may be felt to facilitate the insertion of the rubber tubular member upon the external member of the human body.

MILTON S. DUNKELBERGER.

References Cited in the file of this patent

UNITED STATES PATENTS

| Number | Name | Date |
| --- | --- | --- |
| D. 35,744 | Wittstein | Feb. 18, 1902 |
| 1,992,344 | Alhadate | Feb. 26, 1935 |

FOREIGN PATENTS

| Number | Country | Date |
| --- | --- | --- |
| 232,797 | Germany | Oct. 11, 1910 |
| 595,416 | Germany | Apr. 10, 1934 |